United States Patent [19]

Niimi et al.

[11] E Re. 30,834

[45] Reissued Dec. 29, 1981

[54] ELECTRONIC MUSICAL INSTRUMENT

[75] Inventors: Koji Niimi; Mitsumi Kato, both of Hamamatsu, Japan

[73] Assignee: Nippon Gakki Seizo Kabushiki Kaisha, Hamamatsu, Japan

[21] Appl. No.: 154,767

[22] Filed: May 30, 1980

Related U.S. Patent Documents

Reissue of:

[64] Patent No.: 4,183,275
Issued: Jan. 15, 1980
Appl. No.: 954,237
Filed: Oct. 24, 1978

[30] Foreign Application Priority Data

Oct. 26, 1977 [JP] Japan ..... 52-127633

[51] Int. Cl.[3] ..... G10H 1/00; G10H 5/00

[52] U.S. Cl. ..... 84/1.01; 84/1.19; 84/DIG. 2; 84/DIG. 10

[58] Field of Search ..... 84/1.01, 1.03, 1.11, 84/1.13, 1.19, 1.24–1.26, DIG. 2, DIG. 10

[56] References Cited

U.S. PATENT DOCUMENTS

| | | | |
|---|---|---|---|
| 3,515,792 | 6/1970 | Deutsch | 84/1.03 |
| 3,610,799 | 10/1971 | Watson | 84/1.01 |
| 3,610,805 | 10/1971 | Watson et al. | 84/1.13 |
| 3,610,806 | 10/1971 | Deutsch | 84/1.26 |
| 3,809,786 | 5/1974 | Deutsch | 84/1.01 |
| 3,977,291 | 8/1976 | Southard | 84/1.13 |
| 4,014,238 | 3/1977 | Southard | 84/1.13 |
| 4,018,121 | 4/1977 | Chowning | 84/1.01 |
| 4,080,862 | 3/1978 | Hiyoshi et al. | 84/1.24 |
| 4,108,036 | 8/1978 | Slaymaker | 84/1.01 |
| 4,130,043 | 12/1978 | Niimi | 84/1.03 |
| 4,132,140 | 1/1979 | Chibana | 84/1.11 |
| 4,138,915 | 2/1979 | Nagai et al. | 84/1.19 X |

*Primary Examiner*—Stanley J. Witkowski
*Attorney, Agent, or Firm*—Spensley, Horn, Jubas & Lubitz

[57] ABSTRACT

The musical instrument is of a waveform memory device read out type and comprises a frequency information generator for generating a plurality of sets of frequency informations each set consisting of a subplurality of frequency informations and corresponding to each of the tone pitches of the depressed keys in a keyboard, a selector for selecting one, at a time and one after another, of the subplurality of frequency informations generated by the frequency information generator for each one key depressed, an accumulator for repeatedly accumulating the frequency information selected by the selector to produce an increasing accumulated value, a waveform memory device for storing the amplitude values at successive sampling points in one period of a sine wave utilized to form a desired musical waveform, a comparator for comparing the accumulated value with a preset value and controlling the selecting operation of the selector during the operation of the accumulator. The increasing accumulated value is used to address the waveform memory device to read out therefrom amplitude samples to form a desired musical tone wave form. The output of the waveform memory means is imparted with a volume envelope generated by an envelope waveform generator and then produced as a performance tone by a sound system.

8 Claims, 18 Drawing Figures

ELECTRONIC MUSICAL INSTRUMENT

Matter enclosed in heavy brackets [ ] appears in the original patent but forms no part of this reissue specification; matter printed in italics indicates the additions made by reissue.

BACKGROUND OF THE INVENTION

This invention relates to an electonic musical instrument of a waveform memory read out type wherein a waveform memory device in which the amplitude values at successive sampling points in one period of a desired musical tone waveform are stored in successive addresses is read out by addressing with an accumulated value obtained by repeatedly accumulating, at a predetermined speed, a numerical value corresponding to the tone pitch of a depressed key (hereinafter called a frequency information) and more particularly an electronic musical instrument capable of suitably varying the shape of the waveform read out from the waveform memory device.

In an electronic musical instrument of the waveform memory read out type there is used a frequency information memory device storing frequency informations F corresponding to the tone pitches of respective keys. The frequency information memory device is addressed by key informations representing depressed keys to read out corresponding frequency informations F, and the read out frequency informations F are repeatedly accumulated at a predetermined speed to form progressing accumulated value qF (q=1,2,3 . . . ). This progressing accumulated value is used for sequentially designating the addresses of a waveform memory device in which the amplitude values of successive sampling points which form one period of a desired musical tone waveform have been stored thus sequentially reading out the amplitude values at respective sampling points so as to form a musical tone signal.

For the sake of simplicity, the explanation is done herein with respect to examples of a monophonic type. FIG. 1 is a block diagram showing one example of a prior art electronic musical instrument of a waveform memory read out type which comprises a key switch circuit 1 including a plurality of key switches for respective keys (for example 61 keys) and the output of each key is sent out as a key data KD. A priority circuit 2 connected to receive the key data KD at its input is constructed to produce only one key data KD (key switch output) according to a predetermined order priority (for example, a low tone priority) where a plurality of keys are operated simultaneously, and a key-on signal KON which represents that one of the keys are depressed. A differential circuit 3 is provided to differentiate the build-up portion of a key-on signal KON produced by the priority circuit 2 to produce a differentiated pulse DP. When the differentiated pulse DP produced by the differential circuit 3 is applied to a control terminal 4a, a read-write memory device 4 is written with the key data KD' supplied from the priority circuit 2 whereas in the absence of the differentiated pulse DP, the read-write memory device 4 continuously reads out the key data KD' written therein. There is also provided a frequency information memory device 5 for storing the frequency informations F corresponding to the tone pitches of the respective keys, one information for one pitch. The frequency information memory device 5 is addressed by a key data KD' produced by the read-write memory device 4 to read out corresponding frequency information. An accumulator 6 is connected to the output of the frequency information memory device 5 to sequentially accumulate the frequency information produced by the frequency information memory device 5 at a timing of a clock pulse $\phi$ and to supply its output to a waveform memory device 7. The amplitude values at successive sampling points of one period of a desired musical tone waveform are stored in respective addresses of the waveform memory device 7 and the addresses thereof are addressed by the progressing accumulated value qF (q=1,2 . . . ) produced by an accumulator 6 so as to read out the amplitude values of the waveform stored in the respective addresses, one after another.

In response to the generation of a key-on signal KON, an envelope waveform generator 8 generates an envelope waveform signal EC that controls such envelopes as an attack, a sustain and a decay. A multiplier 9 is connected between the waveform memory device 7 and the envelope waveform generator 8 to multiply the musical tone waveform read out from the former 7 with the envelope waveform signal EC generated by the latter 8 to apply a volume envelope to the musical tone waveform. A sound system 10 is connected to the output of the multiplier 9 to produce a musical tone waveform applied with the volume envelope as a performance tone.

In the electronic musical instrument of the waveform memory read out type described above, when a key of a keyboard, not shown, is depressed, a key switch of the key switch circuit 1 corresponding to the depressed key is closed to produce a signal "1" which applied to the priority circuit 2 through a corresponding output line. The priority circuit 2 selected a key data KD corresponding to a key switch having the highest order of priority among the key data KD (the outputs of operated key switches) applied thereto so as to produce the selected key data as the key data KD' and a key-on signal KON representing that either one of the keys are now being depressed. The differential circuit 3 differentiates the build-up portion of the key-on signal KON to supply to the control terminal 4a of the read-write memory circuit 4 a differentiated pulse DP having a narrow width and synchronous with the build-up portion. During an interval in which the differentiated pulse DP is supplied from the differential circuit 3, the read-write memory device 4 changes its contents to the key data KD' now being supplied from the priority circuit 2 and stores the key data KD'. As a consequence, the read-write memory device 4 continues to produce the same data KD' until a new key is depressed to produce a new key-on signal KON.

The frequency information memory device 5 is addressed by a key data KD' produced by the read-write memory device 4 whereby a frequency information F from among those as shown in Table 1, for example, and corresponding to the tone pitch of the depressed key is read out from the frequency information memory device 5.

TABLE 1

| binary digit key name | integer part $F_{15}$ | fractional part $F_{14}$ | $F_{13}$ | $F_{12}$ | $F_{11}$ | $F_{10}$ | $F_9$ | $F_8$ | $F_7$ | $F_6$ | $F_5$ | $F_4$ | $F_3$ | $F_2$ | $F_1$ | value in Decimal |
|---|---|---|---|---|---|---|---|---|---|---|---|---|---|---|---|---|
| $C_2$ | 0 | 0 | 0 | 0 | 0 | 1 | 1 | 0 | 1 | 0 | 1 | 1 | 0 | 0 | 1 | 0.052325 |
| $C_3$ | 0 | 0 | 0 | 0 | 1 | 1 | 0 | 1 | 0 | 1 | 1 | 0 | 0 | 1 | 0 | 0.104650 |
| $C_4$ | 0 | 0 | 0 | 1 | 1 | 0 | 1 | 0 | 1 | 1 | 0 | 0 | 1 | 0 | 1 | 0.209300 |
| $C_5$ | 0 | 0 | 1 | 1 | 0 | 1 | 0 | 1 | 1 | 0 | 0 | 1 | 0 | 1 | 0 | 0.418600 |
| $C_6$ | 0 | 1 | 1 | 0 | 1 | 0 | 1 | 1 | 0 | 0 | 1 | 0 | 1 | 0 | 0 | 0.837200 |
| $D\#_6$ | 0 | 1 | 1 | 1 | 1 | 1 | 1 | 1 | 0 | 1 | 1 | 1 | 0 | 0 | 0 | 0.995600 |
| $E_6$ | 1 | 0 | 0 | 0 | 0 | 1 | 1 | 1 | 0 | 0 | 0 | 0 | 0 | 0 | 1 | 1.054808 |
| $C_7$ | 1 | 1 | 0 | 1 | 0 | 1 | 1 | 0 | 0 | 1 | 0 | 1 | 0 | 0 | 1 | 1.674400 |

The frequency information F read out from the frequency information memory device 5 and corresponding to the pitch of the depressed key is repeatedly accumulated by an accumulator 6 at a period (i.e. speed) of a clock pulse $\phi$ to produce an increasing accumulated value qF, where q represents an increasing integer. The increasing accumulated value is used to sequentially address a waveform memory device 7 for sequentially reading out the amplitude values of the waveform stored in the respective addresses, one after another.

The key-on signal KON produced by the priority circuit 2 is also supplied to an envelope waveform generator 8 which generates an envelope waveform signal EC for attack and sustain portions as the key-on signal KON is generated. When the key-on signal KON is extinguished due to key release, an envelope waveform signal EC of the decay portion is generated by the envelope signal generator 8. The envelope waveform signal EC thus produced is applied to a multiplier 9 where it is multiplied with the musical tone waveform read out from the waveform memory device 7 to be imparted with a volume envelope. The musical sound waveform imparted with the volume envelope is converted into a musical tone by a sound system 10.

Where a frequency information F is read out from the frequency information memory device 5 in response to key data KD', the frequency $f_T$ of the musical tone waveform read out from the waveform memory device 7 is expressed by an equation $$f_T = f_O \times F/M$$

wherein M represents the modulo of the accumulator (i.e. number of addresses of waveform memory) and $f_O$ the frequency of the clock pulse $\phi$.

The electronic musical instrument of the type descriped above is disclosed in U.S. Pat. Nos. 3,610,806, 3,610,805 and 3,610,799, all dated Oct. 5, 1971.

Since the electronic musical instrument shown in FIG. 1 is constructed such that the frequency information F corresponding to the tone pitch of each key is stored in the frequency information memory device 5, that the stored frequency information is read out when a corresponding key is depressed, that the read out frequency information is sequentially accumulated at a predetermined speed to obtain an increasing accumulated value qF and that the accumulated value qF is used to sequentially read out the amplitude values at successive sampling points in one period of the musical waveform stored in the waveform memory device 7. Accordingly, when the waveform stored in the waveform memory device is determined once the shape of the musical tone waveforms which are read out from the waveform memory device would be always the same so that it is impossible to change the waveform (for example, tone color).

U.S. Pat. No. 3,515,792 issued on June 2, 1970 discloses an improved electronic musical instrument wherein a plurality of waveform memory devices are provided for storing musical tone waveforms having different shapes and the plurality of waveform memory devices are selectively addressed to change the waveform (tone color) of the generated musical tone.

However, the use of a plurality of waveform memory devices not only complicates the construction of the musical instrument but also makes it difficult to store complicated musical tone waveform in the waveform memory device.

SUMMARY OF THE INVENTION

Accordingly, it is an object of this invention to provide an improved electronic musical instrument of the waveform memory read out type capable of readily varying the waveform of the musical tone wave read out from a waveform memory device.

According to a preferred embodiment of this invention a plurality of frequency informations are prepared for each one key and they are used alternately for forming a non-linearly increasing accumulated value qF to be utilized to address a waveform memory device. The frequency informations are switched over during such accumulation and the switching point is varied to vary the output waveform of the waveform memory device thereby variably controlling the color of the generated musical tone.

Briefly stated the electronic musical instrument of this invention comprises a keyboard provided with a plurality of keys for respective tone pitches, means for generating a plurality of frequency informations corresponding to the tone pitch of depressed one of the keys, selecting means for selecting either one at a time of the plurality of frequency informations produces by the frequency information generating means, accumulating means for repeatedly accumulating the frequency information selected by the selecting means to produce a progressing accumulated value, a waveform memory device which is adapted to store amplitude values at successive sampling points in one period of a waveform utilized to form a desired musical waveform and which is addressed with the progressing accumulated value from the accumulating means, control means for switching the selecting operation of the selecting means during the accumulating operation of the accumulating means to select different ones time wisely from among said plurality of frequency informations, and means for converting the musical tone waveform read out from the waveform memory device into a musical tone.

DESCRIPTION OF THE PREFERRED EMBODIMENTS

Figure 1:
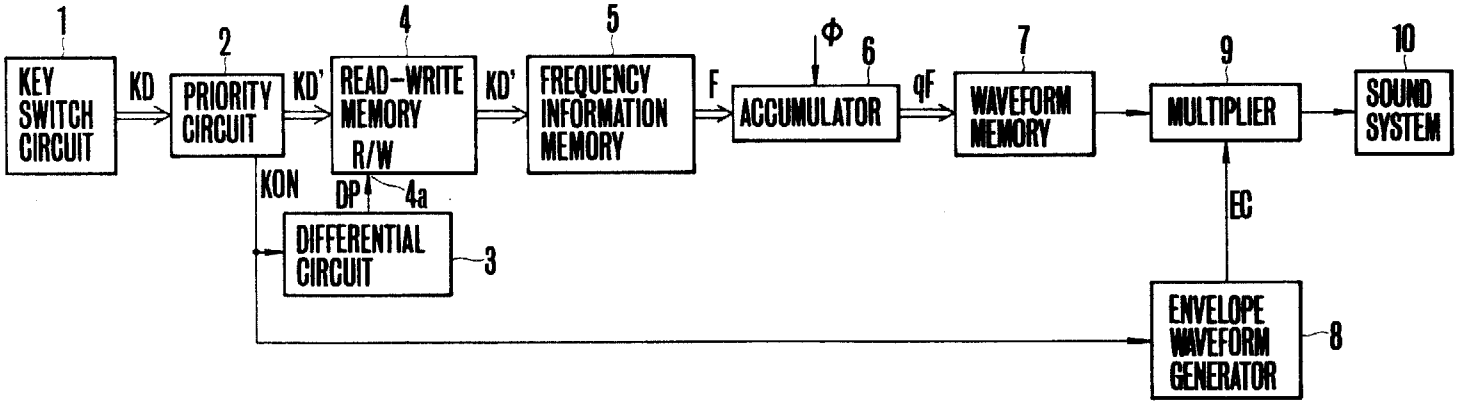
FIG. 1 PRIOR ART
FIG. 1 is a block diagram showing a typical example of a prior art electronic musical instrument of the waveform memory read out type.
Figure 2:
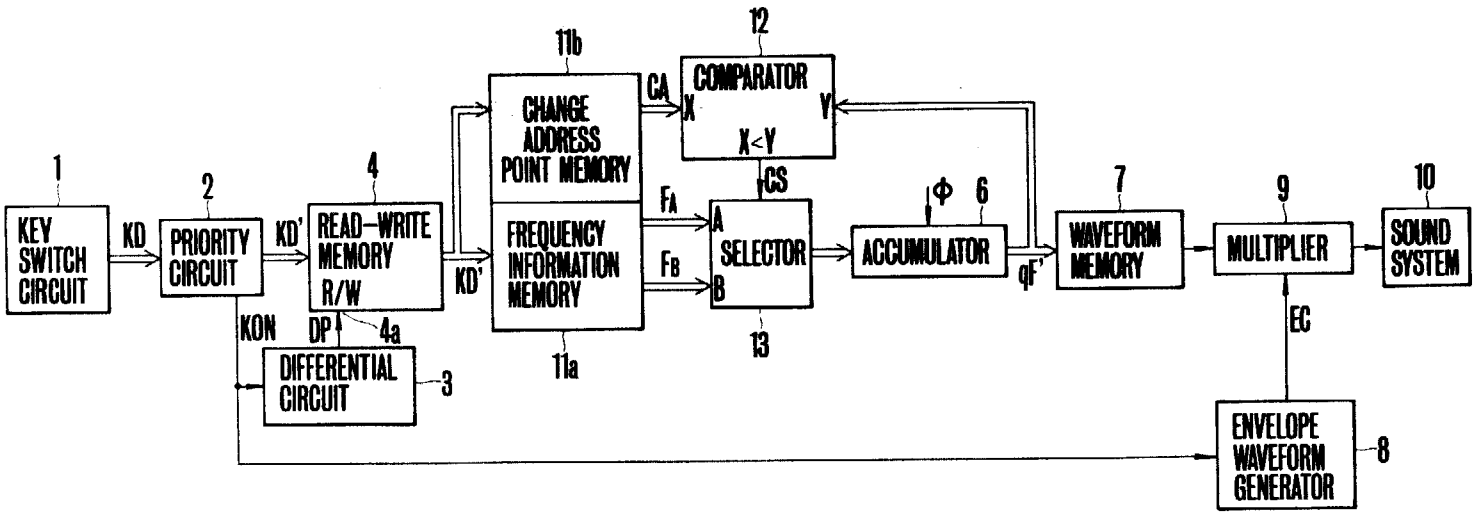
FIG. 2 is a block diagram showing one embodiment of the electronic musical instrument embodying the present invention.

In FIG. 2 showing a preferred embodiment of this invention circuit components corresponding to those shown in FIG. 1 are designated by the same reference characters. This embodiment comprises a frequency information memory device 11a and a change address point signal memory device 11b which are respectively addressed by a key data KD' supplied from a read-write memory device 4. In the addresses of the frequency information memory device 11a are stored a frequency information $F_A$ which is more or less shifted in the positive direction with respect to a normal frequency information F (Table 1) corresponding to the tone pitch of each key, and a frequency information $F_B$ which is more or less shifted in the negative direction, whereas in the change address memory device 11b is stored a change address point signal CA wherein the switching point between the frequency informations $F_A$ and $F_B$ is represented by an address value of the waveform memory device 7. The frequency informations $F_A$ and $F_B$ will be described later in detail. A comparator 12 is connected to receive the change address point signal CA produced by the change address point signal memory device at its X input and to receive the accumulated value output of the accumulator 6 at its Y input for comparing the X and Y inputs. This comparator 12 produces a difference signal only when $X<Y$. Furthermore a selector 13 is connected to receive the frequency informations $F_A$ and $F_B$ produced by the frequency information memory device 11a at its inputs A and B respectively. Normally, the selector 13 selects the frequency information $F_A$ supplied to its input A for supplying the frequency information $F_A$ to accumulator 6 whereas when supplied with the difference signal CS from the comparator 12, the selector 13 selects the frequency information $F_B$ applied to its input B for supplying the frequency information $F_B$ to the accumulator 6.

The electronic musical instrument shown in FIG. 2 operates as follows. More particularly, when a key of the keyboard is depressed the key switch circuit 1 produces a key data KD corresponding to the depressed key. Among the key data KD those having a higher order of priority is selected by the priority circuit 2 and produced therefrom as a key data KD'. At the same time, the priority circuit 2 produces a key-on signal KON showing that one of the keys is now being depressed. The key-on signal KON is differentiated by the differential circuit 3 to apply a differential pulse DP synchronous with the building-up portion of the key-on signal KON to the read-write control terminal 4a of the read-write memory device 4. Consequently, the content of the read-write memory device 4 is changed to the key data KD' produced by the priority circuit 2 when the differential pulse DP is received, and the key data KD' is kept and continuously produced by the read-write memory device until the next differential pulse DP is received. The addresses of the frequency information memory device 11a and of the change address point signal memory device 11b corresponding to the key data KD' produced by the read-write memory device 4 are controlled to respectively read out the frequency informations $F_A$ and $F_B$ and the change address point signals CA stored in said addresses. At the time of the initial key depression, the accumulated value qF' of the accumulator 6 is zero so that the comparator 12 produces no difference signal CS, that is its output is "O". Consequently, the selector 13 selects the frequency information $F_A$ applied to its input A and applies it to the accumulator 6. The accumulator 6 sequentially accumulates the frequency information $F_A$ supplied from the selector 13 with the period of the clock pulse $\phi$ to form an accumulated value qF' ($qF_A$) which is used to address the waveform memory device 7.

Figure 3:
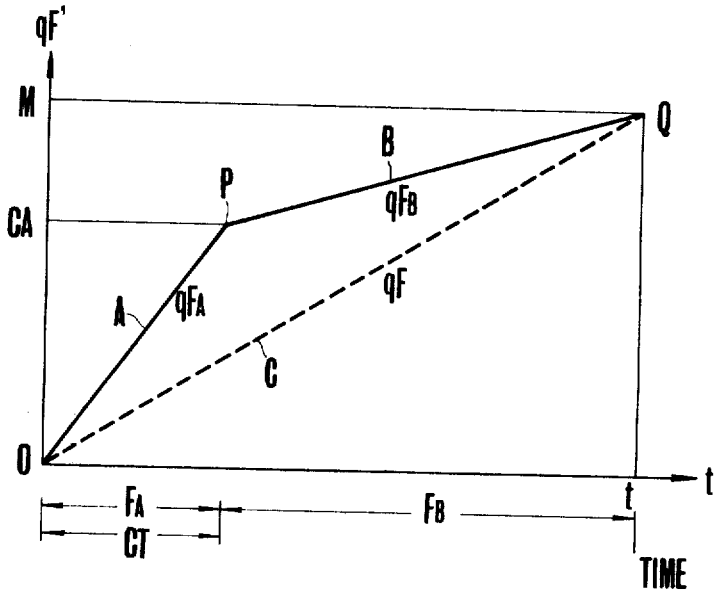
FIG. 3 is a graph showing the manner of varying the accumulated value of the accumulator shown in FIG. 2.

FIG. 3 shows the variation of the accumulated value qF with respect to time in which M represents the modulo of the accumulator 6. The accumulated value qF obtained by accumulating the normal frequency information F (Table 1) corresponding to the tone pitch of the depressed key increases along a dotted line C, whereas at first the accumulated value qF' obtained by accumulating the frequency information $F_A$ increases at a higher rate as shown by a solid line A. When the accumulated value qF' (or $qF_A$) of the accumulator 6 exceeds the change address point signal CA produced by the change address point signal memory device 11b the comparator 12 produces a difference signal CS which is applied to selector 13 whereby the selector selects the frequency information $F_B$ for supplying it to the accumulator 6. Now the accumulator 6 begins to accumulate the frequency information $F_B$ which is smaller than the frequency information $F_A$ with the timing of the clock pulse $\phi$ to produce the accumulated value qF' ($qF_B$) which is used to address the waveform memory device 7. Thus, as shown in FIG. 3 after the accumulated value qF' has exceeded the change address signal CA at point P, the rate of increase of qF' becomes smaller than that of C as shown by a solid line B. When the accumulated value qF' reaches the modulo M at a point Q the accumulator 6 overflows to reduce its content to zero. Accordingly, the difference signal CS produced by comparator 12 becomes "O" and the selector 13 reselects the frequency information $F_A$ to supply it to the accumulator 6. Thereafter, above described operations are repeated to produce the accumulated value qF' whose rate of change changes of point P (corresponding to the change address point signal CA) as shown by straight lines A and B. The accumulated value qF' thus obtained is supplied to the waveform memory device 7 to act as an address signal for successively reading out the amplitude values of the waveform at successive sampling points to form a musical tone signal.

Figure 4:
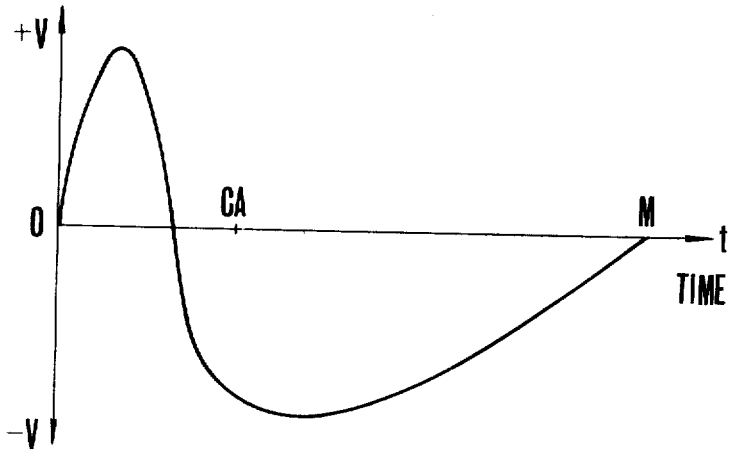
FIG. 4 is a graph showing the output waveform of the waveform memory device shown in FIG. 2.

Suppose now that the most significant address of the waveform memory device 7 is equal to M and that the amplitude values at successive sampling points in one cycle of a sine wave are stored in successive addresses of the waveform memory device. Then according to the prior art system shown in FIG. 1, since the waveform memory device 7 is addressed by the accumulated value qF which increases at a constant rate as shown by dotted line C, FIG. 3, the stored waveform (sine wave) would be read out from the waveform memory device 7 as the desired musical tone waveform. However, as shown by straight lines A and B, FIG. 3, when the accumulated value qF' ($qF_A$, $qF_B$) whose rate of increase varies in one cycle is used to address the waveform memory device 7, the addresses thereof are read out at a higher speed until the address change point CA is reached whereas read out at a lower speed between the address change point CA and the most significant address M. Consequently, from the waveform memory device 7 storing a sine wave is read out a distorted waveshape for the musical tone wave as shown in FIG. 4 wherein the portion of the waveform up to the change address point CA is compressed whereas the portion between the change address point CA and the most significant address M is expanded. In the multiplier 9, the distorted sinusoidal waveform read out from the waveform memory device 7 is multiplied with the envelope waveform signal EC generated by the envelope waveform generator 8 to be imparted with a volume envelope. When this musical tone waveform is converted into a musical tone by the sound system, the color of the musical tone varies from that produced by a sine wave musical tone waveform as the shape of the musical tone waveform varies with time.

Consequently, it is possible to vary as desired the waveform read out from the waveform memory device 7 by suitably selecting the frequency informations $F_A$ and $F_B$ and the change address point CA thereby producing musical tones having various waveforms. The period of the resulting musical tone waveform is expressed by an equation $$\left(\frac{CA}{F_A} + \frac{M - CA}{F_B}\right) \cdot \frac{1}{f_c}$$

where $f_c$ represents the frequency of the clock pulse $\phi$.

Consequently, the frequency $f_T'$ of the resulting musical tone (the output of the waveform memory device 7, is expressed by the following equation.

$$f_T = \frac{F_A \cdot F_B}{F_A \cdot M - CA(F_A - F_B)} \cdot f_c$$

When selecting the frequency informations $F_A$ and $F_B$ and the change address point CA, it is necessary to make the frequency $f_T'$ to be equal to frequency $f_T$ which corresponds to the tone pitch of the depressed key. For example, where it is selected that the most significant address of the waveform memory device M=1024, the frequency $f_c$ of the clock pulse $\phi$=28.16 kHz, and the change address point CA=768, one example of the combination of the frequency informations $F_A$ and $F_B$ for producing a musical tone signal having a frequency of $f_T$=27.5 $H_Z$ (period=36.3636 ms) is shown in the following Table 2. In Table 2, the change address timing CT was calculated according to an equation $(CA/R_1).(1/f_c=CT$. This timing shows the timing of switching the frequency information from $F_A$ to $F_B$.

TABLE 2

| | $F_A$ | $F_B$ | CT(ms) |
|---|---|---|---|
| I | 1.0 | 1.0 | 28.273 |
| II | 1.5 | 0.5 | 18.182 |
| III | 3.0 | 0.3333 | 9.091 |
| IV | 6.0 | 0.28671 | 4.545 |
| V | 12.0 | 0.26667 | 2.273 |
| VI | 24.0 | 0.25806 | 1.136 |

Figure 5:
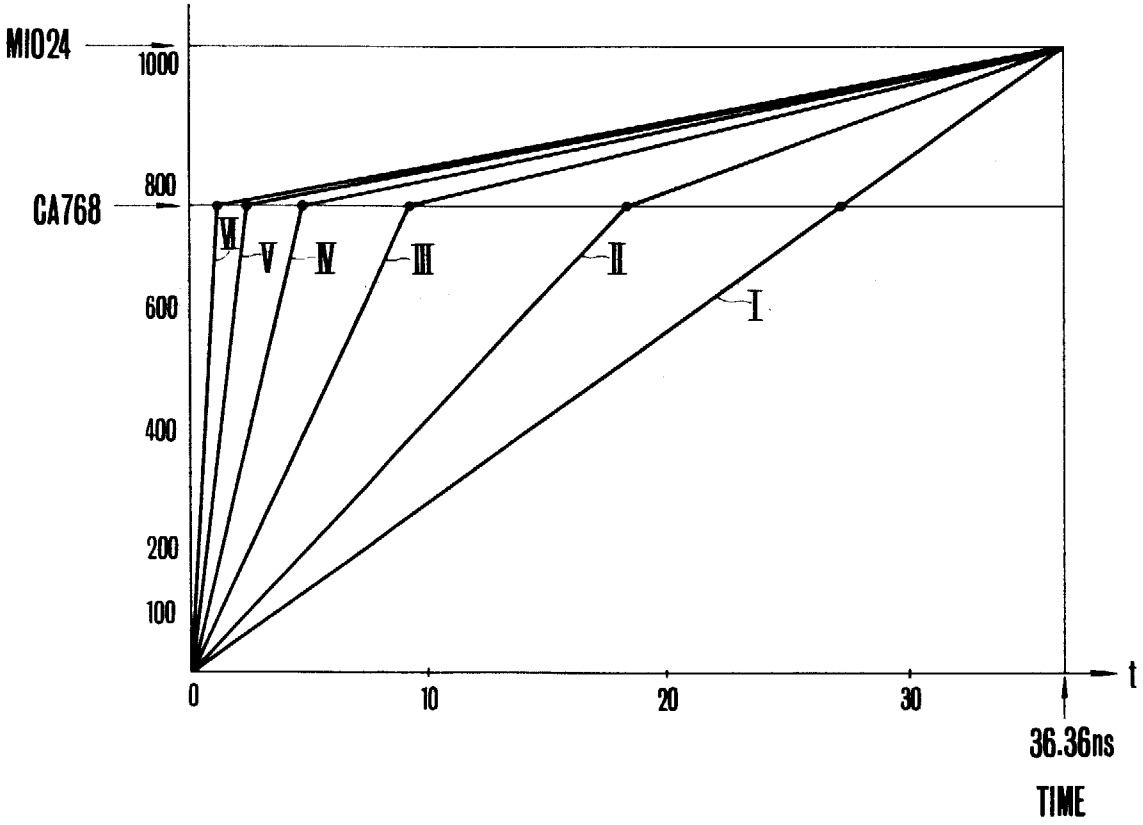
FIG. 5 is a graph showing the relationship between combinations of the frequency informations $F_1$ and $F_2$ shown in FIG. 2 and the variation in the accumulated value of the accumulator.

FIG. 5 shows the variation with time of the accumulated value qF' of the accumulator 6 when various values of the frequency informations $F_A$ and $F_B$ shown in Table 2 are used. Thus, where the frequency informations $F_A$ and $F_B$ are equal (Table 2- I), the variation becomes a straight line which is identical to that read out from the prior art waveform memory device. As the difference between the frequency informations $F_A$ and $F_B$ increases as shown by II, III . . . in Table 2, the change address point CA of the accumulated value qF' is reached as an earlier time. In other words, the interval between the change address point CA and the most significant address M becomes shorter. For this reason, by increasing the difference between frequency informations $F_A$ and $F_B$, the output waveform of the waveform memory device 7 read out therefrom by the accumulated value qF' would depart from the waveform stored in the waveform memory device 7, thus producing a musical tone waveform having different shape and color from those stored in the waveform memory device 7.

Figure 6:
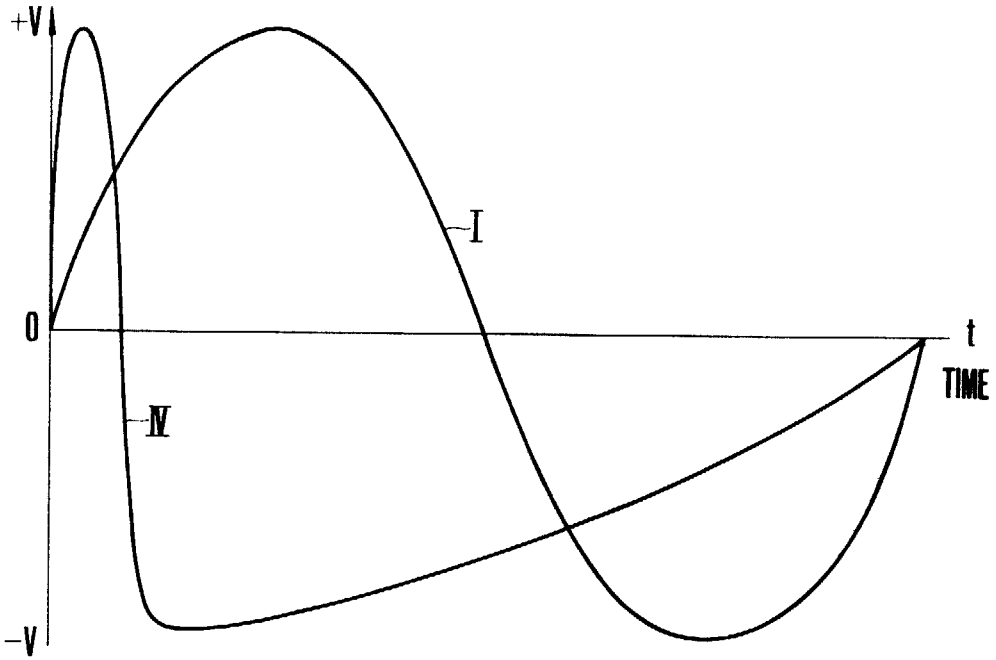
FIG. 6 is a graph showing an output waveform produced by addressing the waveform memory device storing a sine wave formed by combining frequency informations $F_1$ and $F_2$ shown in FIG. 5.

For example, when the waveform memory device 7 storing a sine waveform is addressed with an accumulated value qF' of the frequency information $F_A$ and $F_B$ shown in Table 2- I, the same sine wave as that has been stored in the waveform memory device 7 would be read out as shown be curve I in FIG. 6, whereas when the accumulated value qF' of the frequency information $F_A$ and $F_B$ shown in Table-IV is used to address the waveform memory device 7 storing the sine wave, the first half of the sine wave read out from the waveform memory device 7 would be greatly compressed whereas the second half greatly expanded as shown by curve IV in FIG. 6 thus greatly varying the color of the generated musical tone.

As above described, by changing the frequency information that forms the progressing accumulated value of the accumulator which is used as an address signal of a waveform memory device, at an intermediate point of one cycle of addressing the waveform memory device it is possible to change the sine wave that has been stored in the waveform memory device to various waveforms other than the sine waveshape, thus variably changing the color of the resulting musical tone from a conventional system utilizing a single waveform memory device.

Figure 7:
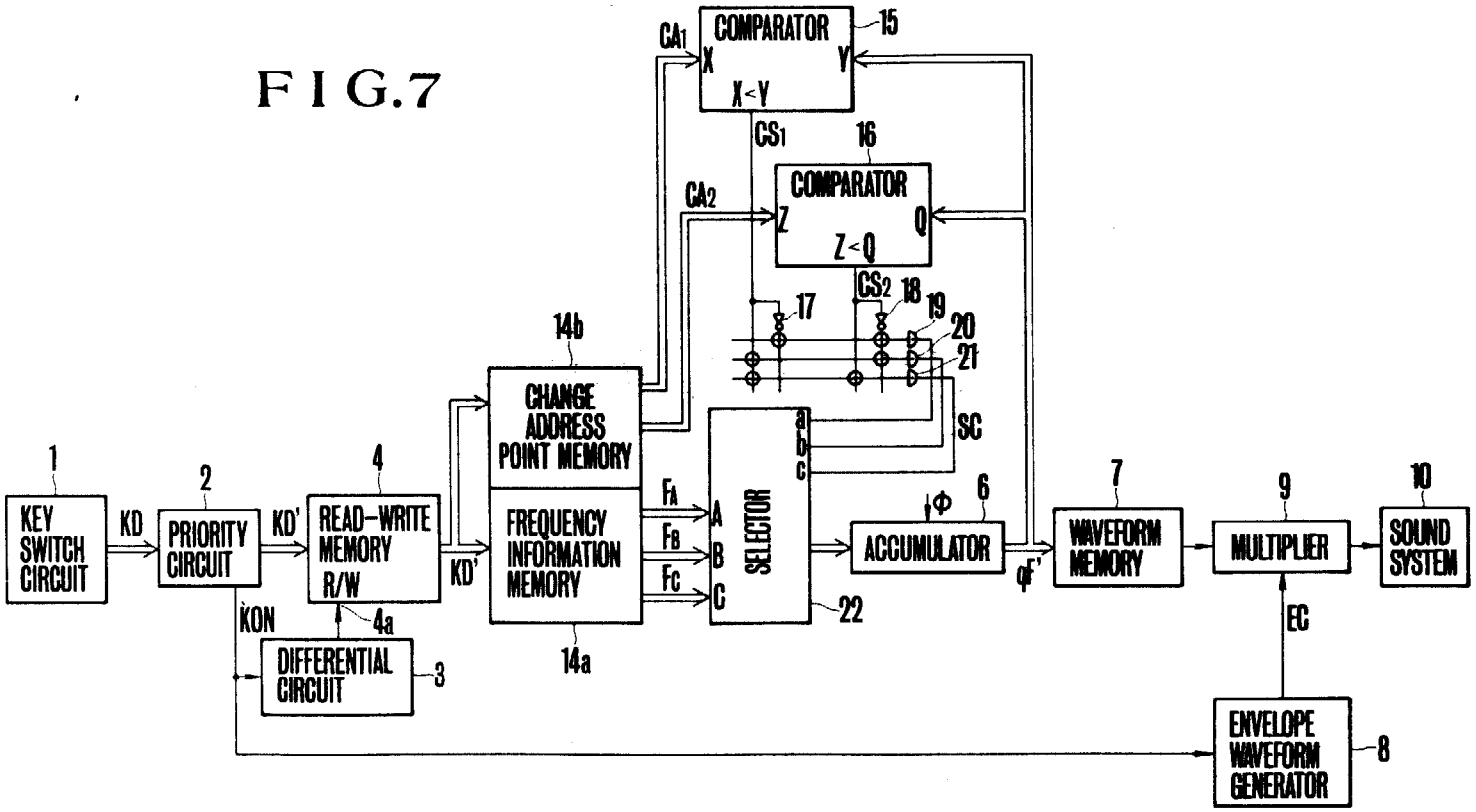
FIG. 7 is a block diagram showing a modified embodiment of the electronic musical instrument according to this invention.

FIG. 7 is a block diagram showing another embodiment of the electronic musical instrument of this invention, in which circuit elements identical to those shown in FIG. 2 are designated by the same reference charactors. In FIG. 7, reference numerals 14a and 14b show a frequency information memory device and a change address point memory device respectively which are addressed by a key data KD' produced by the read-write memory device 4 and in the addresses of these memory devices 14a and 14b are stored three kinds of frequency informations $F_A$, $F_B$ and $F_C$ and two different change address points $CA_1$ and $CA_2$ respectively. The frequency informations $F_A$, $F_B$ and $F_C$ are set to satisfy a relationship $F_A > F_C > F_B$ whereas the change address points $CA_1$ and $CA_2$ are set to satisfy a relationship $CA_1 < CA_2$.

A first comparator 15 is provided with its input X connected to receive the change address point signal $CA_1$ produced by the change address point memory device 14b and input Y connected to receive the accumulated value qF' of accumulator 6. The comparator 15 produces a difference signal $CS_1$ only when $X < Y$. There is also provided a second comparator 16 with its input Z being connected to receive change address point signal $CA_2$ produced by the change address point memory device 14b and with its input Q being connected to receive the accumulated value qF' of the accumulator 6. The second comparator 16 produces a difference output $CS_2$ only when $Z < Q$. Reference numeral 17 represents an inverter supplied with the difference signal $CS_1$, and numeral 18 an inverter supplied with the difference signal $CS_2$. The outputs of the inverters 17 and 18 are applied to the input of an AND gate circuit 19, whereas the difference signal $CS_1$ and the output of the inverter 18 are applied to the inputs of an AND gate circuit 20. The difference signals $CS_1$ and $CS_2$ are applied to the inputs of an AND gate circuit 21, a selector 22 is provided having its inputs A, B and C connected to receive the frequency informations $F_A$, $F_B$ and $F_C$ respectively produced by the frequency information memory device 14a and control inputs a, b and c connected to receive selection control signals SC produced by AND gate circuits 19, 20 and 21. The selector 22 selects one of the signals applied to its inputs A, B and C in accordance with the control signals applied to the control terminal a-c and applies the selected signal to the accumulator 6.

The modification shown in FIG. 7 operates as follows. When a key is depressed a key data corresponding thereto is produced. The key data having the highest order of priority is selected by the priority circuit 2 to form a key data KD' as well as a key-on signal KON representing the depressed key. The key-on signal KON is differentiated by the differential circuit 3 to produce a differentiated pulse DP synchronous with the building-up of the signal KON, which is applied to the read-write control terminal 4a of the read-write memory circuit 4. Consequently, the content of this memory circuit 4 is changed to the key data KD' produced by the priority circuit 2 when the differentiated pulse DP is applied, and the key data KD' is continuously produced by the read-write memory circuit 4 until the next differentiated pulse DP is received. The addresses of the frequency information memory device 14a and the change address point memory device 14b respectively corresponding to the key data KD' produced by the read-write memory device 4 are controlled to read out the frequency informations $F_A$, $F_B$ and $F_C$ and the change address point signals $CA_1$ and $CA_2$ which have been stored in these addresses.

Figure 8:
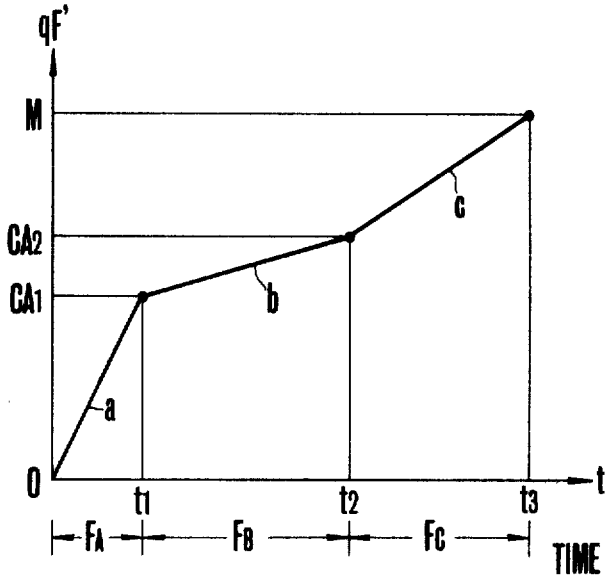
FIG. 8 is a graph showing the variation with time of the accumulated value of the accumulator shown in FIG. 7.

At the time of firstly depressing a key, the accumulated value qF' of the accumulator 6 is zero so that the difference signals $CS_1$ and $CS_3$ produced by the comparators 15 and 16 are both "O". Consequently, the outputs of the inverters 17 and 18 which invert the difference signals $CS_1$ and $CS_2$ are both "1" with the result that only the AND gate circuit 19 produces a "1" output thereby applying a selection control signal CS to the control input a of the selector 22. Then the selector 22 selects the frequency information $F_A$ supplied to input A corresponding to the control input a and supplies the frequency information to accumulator 6. Thus this accumulator sequentially accumulates the frequency information $F_A$ with the timing of the clock pulse $\phi$ to obtain an increasing accumulated value qF' ($=qF_A$) which is used to address the waveform memory device 7. Since, as above described, the frequency information $F_A$ has the largest value among the three, the accumulated value qF' of the accumulator 6 increases at a high rate as shown by a solid line a shown in FIG. 8 with the result that the speed of addressing the waveform memory device 7 is high. As the accumulated value qF' exceeds the change address point CA, at time $t_1$ as shown in FIG. 8, the difference signal $CS_1$ produced by the comparator 15 becomes "1". As a consequence, the output of only AND gate circuit 20 becomes "1" to apply the selector control signal SC to the control input b of the selector 22 whereby the selector 22 selects the frequency information $F_B$ supplied to its input B and applies this frequency information $F_B$ to the accumulator 6 which sequentially accumulates the frequency information $F_B$ with the timing of clock pulse $\phi$ and the accumulated value qF' is used to address the waveform memory device 7. As above described, since the frequency information $F_B$ has a value smallest among the three, ($F_A > F_C > F_B$) the rate of increase of the accmumulated value qF' is also decreased as shown by a straight line b shown in FIG. 8 with the result that the speed of addressing the waveform memory device 7 also decreases. When the accumulated value qF' of the accumulator 6 exceeds a change address point $CA_2$ at time $t_2$ as shown in FIG. 8, the difference signal $SC_2$ of the comparator 16 which compares the change address point value $CA_2$ with the accumulator value qF' also becomes "1" thus applying a selector control signal SC to the control input c of the selector 22 through the AND gate circuit 21. Consequently, the selector 22 selects the frequency information $F_C$ applied to input C corresponding to the control input $c_1$ and applies the selected frequency information $F_C$ to the accumulator 6. The accumulator 6 sequentially accumulates the frequency information $F_C$ with the timing of the clock pulse $\phi$ to product an accumulated value qF' utilized to address the waveform memory device 7. Since the frequency information $F_C$ has a value intermediate of those of the frequency informations $F_A$ and $F_B$ the rate of increase of the accumulated value qF' increases relatively steeply as shown by a straight line c shown in FIG. 8. At time $t_3$, the accumulated value qF' reaches the most significant address of the waveform memory device whereby it overflows. Thereafter the accumulator 6 repeats the operation described above.

Figure 9:
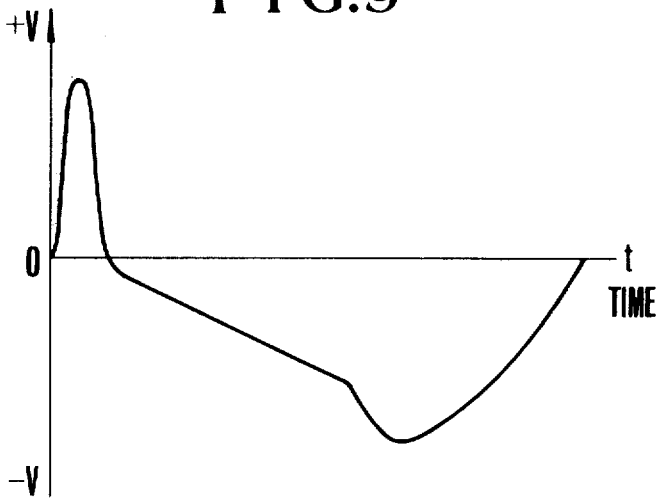
FIG. 9 is a graph showing an output waveform of a waveform memory device storing a sine wave and addressed by the accumulated value shown in FIG. 8.

In the electronic musical instrument shown in FIG. 7 the speed of addressing the waveform memory device 7 changes twice during one cycle of the reading out operation of the waveform memory device 7. More particularly, the speed of addressing is high up to the change address point $CA_1$, moderate between change address points $CA_1$ and $CA_2$ and becomes relatively high between the change address point $CA_2$ and the most significant address M. Consequently, as the waveform memory 7, the respective addresses thereof storing the amplitude values at respective sampling points of one cycle of a sine wave, is addressed with the accumulated value qF' having the varying characteristic described above, an extremely complicated wave as shown in FIG. 9 would be read out from the waveform memory device 7. In the multiplier 9, this output waveform is multiplied with the envelope waveform signal EC produced by the envelope waveform generator 8 to be imparted with a volume envelope. The waveform applied with the volume envelope is converted by the sound system 10 into a musical tone having an extremely complicated color corresponding to the shape of the output wave of the waveform memory device 7.

Just in the same manner as in the previous embodiment, when setting the frequency informations $F_A$, $F_B$ and $F_C$ and change address points $CA_1$, $CA_2$ and $CA_3$, it is necessary to make equal the frequency of the output waveform addressed and read out from the waveform memory device by the accumulated value qF' of the accumulator 6 to be equal to the frequency corresponding to the tone pitch of the depressed key. While in the embodiment shown in FIG. 7, the frequency information to be supplied to the accumulator was changed twice during one cycle of addressing the waveform memory device by using three different frequency informations $F_A$, $F_B$ and $F_C$, and two different change address point signals $CA_4$ and $CA_2$, it will be clear that it is also possible to read out an output having more complicated shape from the waveform memory device by changing many times the frequency information in one cycle.

Figure 10:
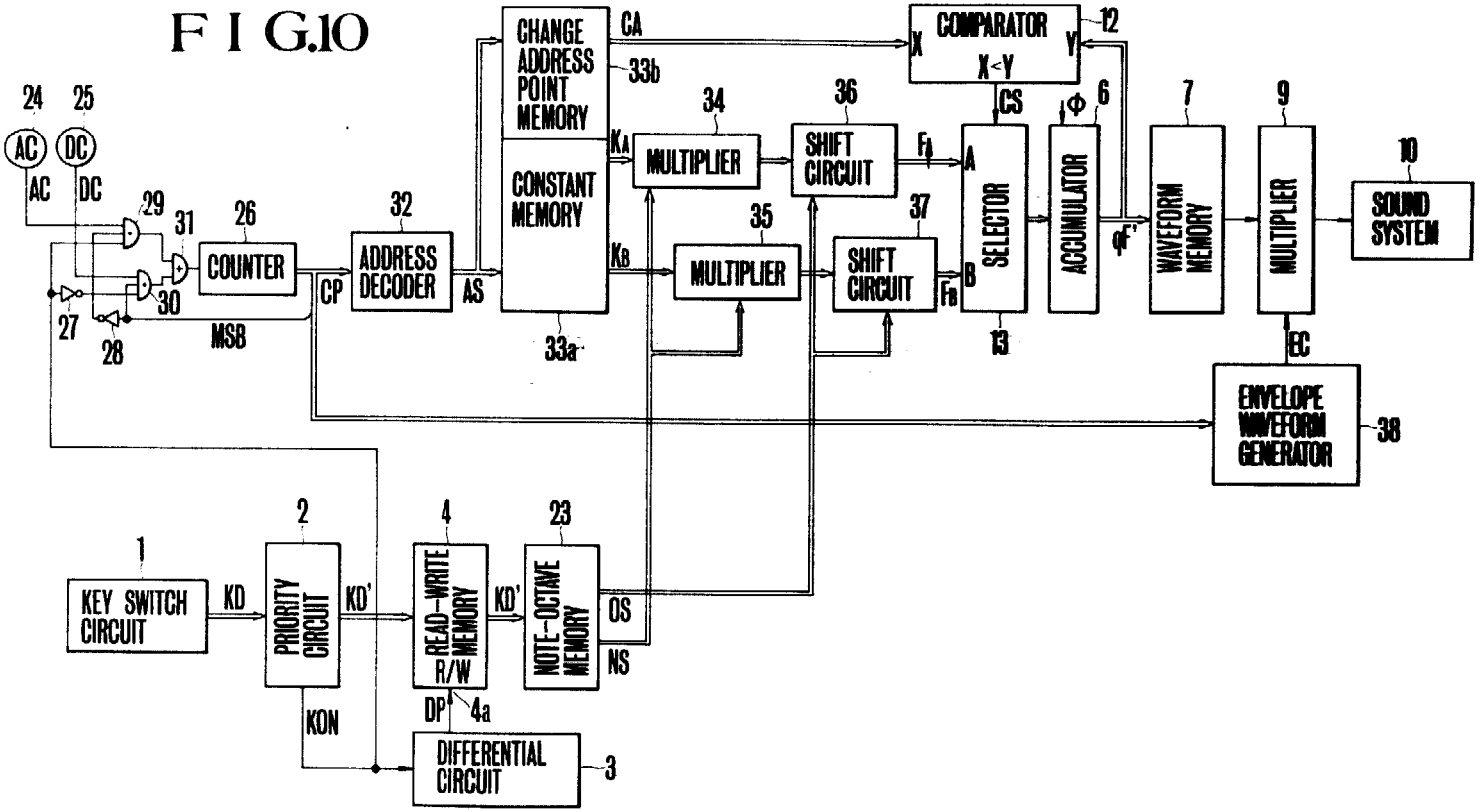
FIG. 10 is a block diagram showing a still further embodiment of the electronic musical instrument of this invention.

FIG. 10 shows a still further embodiment of this invention in which circuit elements corresponding to those shown in FIG. 2 are designated by the same reference characters. There is provided a note-octave memory device 23 which is addressed by a key data KD' produced by the read-write memory device 4 and in the addresses of the note-octave memory device 23 are stored note signals NS and the octave signals corresponding the tone pitches of respective keys. There are also provided an attack clock pulse generator 24, a decay clock pulse generator 25 and a 10 bit counter 26 which is constructed to produce in parallel the count values of respective bits. Inventer 27 is provided to invert the key-on signal KON produced by the priority circuit 2 and an inverter 28 is provided to invert the most significant bit (10th bit) signal of the count signal produced by counter 26. The attack clock pulse AC produced by the attack clock pulse generator 24, the key-on signal KON and the output of the inverter 28 are applied to the inputs of an AND gate circuit 29, whereas the decay clock pulse DC produced by the decay clock pulse oscillator 25, the output of the inverter 27 and the most significant bit (MSB) signal of the count signal CP produced by the counter 26 are applied to the inputs of an AND gate circuit 30. The outputs of AND gate circuit 29 and 30 are applied to the input of counter 26 via an OR gate circuit 31. An address decoder 32 is provided to convert the 10 bit output of the counter 26 into 6 bit address signals as shown in the following Table 3 and corresponding to the variation in the output of the envelope waveform generator 38 to be described later.

TABLE 3

| count signal CP | output signal AS of address decoder 32 | | | | | |
|---|---|---|---|---|---|---|
| of counter 26 | I | II | III | IV | V | VI |
| 0–127 | 1 | 0 | 0 | 0 | 0 | 0 |
| 128–255 | 0 | 1 | 0 | 0 | 0 | 0 |
| 256–383 | 0 | 0 | 1 | 0 | 0 | 0 |
| 384–511 | 0 | 0 | 0 | 1 | 0 | 0 |
| 512 | 0 | 0 | 0 | 0 | 1 | 0 |
| 513–1023 | 0 | 0 | 0 | 0 | 0 | 1 |

There are also provided a constant memory device 33a and a change address point signal memory device 33b which are addressed by an address signal produced by the address decoder 32 and in respective addresses of these memory devices 33a and 33b are stored constants $K_A$ and $K_B$ (which differ slightly) which are used as the basis of forming the frequency informations corresponding to the tone pitches of respective keys, and the change address point signal $C_A$.

Figure 11A:
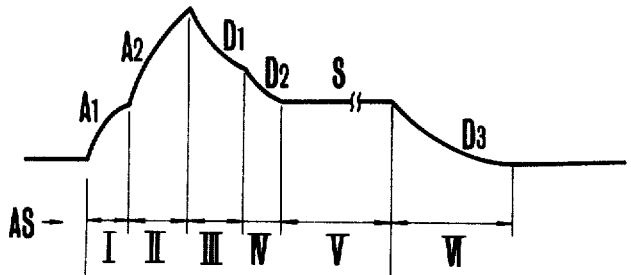
FIGS. 11A and 11B show the waveforms of the envelope waveform signal and of the key-on signal shown in FIG. 10.
Figure 11B:
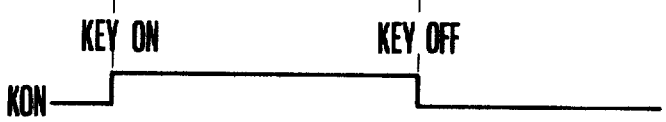

Multipliers 34 and 35 respectively multiply the constants $K_A$ and $K_B$ produced by the constant memory device 33a with the note signal NS produced by the note-octave memory device 23 and the outputs of these multipliers 34 and 35 are shifted in shifters 36 and 37 by the octave signal OS produced by the note-octave memory device 23 to form frequency informations substantially corresponding to the tone pitch of the depressed key. The resulting frequency informations $F_A$ and $F_B$ are applied to inputs A and B respectively of the selector 13. An envelope waveform generator 38 is provided to form an envelope waveform signal EC is response to the count signal CP produced the counter 26. The envelope waveform generator 38 produces the envelope waveform signal EC consisting of the first attack portion $A_1$, the second attack portion $A_2$, the first decay portion $D_1$, the second decay portion $D_2$, the sustain portion S and the third decay portion $D_3$ which are shown in FIG. 11A and corresponding to the outputs I through VI of the address decoder 32 shown in Table 3 and has a construction similar to that of the waveform memory device 7. FIG. 11B shows the key-on signal KON.

Figure 12:
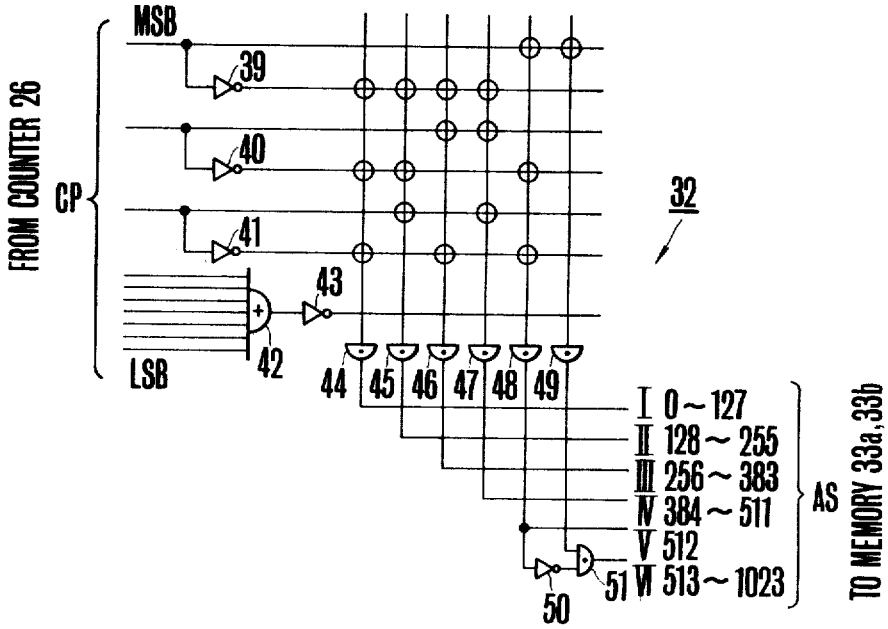
FIG. 12 is a connection diagram showing one example of the address decoder shown in FIG. 10.

FIG. 12 shows one example of the address decoder 32 comprising inverters 39, 40 and 41 which inverts the upper three bit signals of the count signal CP produced by counter 26, an OR gate circuit 42 supplied with lower 7 bit signals of the count signal CP, an inverter 43 for inverting the output of the OR gate circuit 42, an AND gate circuit 44 supplied with the outputs of inverters 39, 40 and 41, an AND gate circuit 45 supplied with the outputs of inverters 39 and 40 and the upper third bit signal of the count signal CP, an AND gate circuit 46 supplied with the outputs of inverters 39 and 41 and the upper second bit signal of the count signal CP, an AND gate circuit 47 supplied with the output of inverter 39 and the upper second and third bit signals of the count signal CP, an AND gate circuit 48 supplied with the outputs of inverters 40, 41 and 43 and the most significant bit signal of the count signal CP, an inverter 50 for inverting the output of the AND gate circuit 45, and an AND gate circuit 51 supplied with the outputs of AND gate circuit 49 and the output of inverter 50.

In the address decoder 32 described above, during an interval in which the second signal CP changes from [0] to [127] the output I of only the AND gate circuit 44 becomes "I", during an interval in which the count signal CP changes from [128] to [255], the output 11 of only AND gate circuit 45 becomes "I" and during an interval in which the count signal changes from [256], the output III of only AND gate circuit 46 becomes "I"Further, during an interval in which the count signal CP changes from [384] to [511] the output IV of only AND gate circuit 47 becomes "1". In a state wherein the count signal CP is [512] the output V of only AND gate circuit 48 becomes "1" whereas during an interval in which the count signal CP changes from [513] to [1023], the output VI of only AND gate circuit 51 becomes 1, thus providing the input/output characteristics shown in Table 3.

When a key of the keyboard is depressed, a key data KD corresponding to the depressed key is produced by the key switch circuit 1. A key data KD having a higher order of priority is selected and produced as a key data KD' by the priority circuit 2 which further produces a key-on signal KON showing that one of the keys is now being depressed, this key-on signal KON is differentiated by the differential circuit 3 to apply a differentiated pulse DP synchronous with the building-up of the key-on signal KON to the read-write control terminal 4a of the read-write memory device 4. In response to the differentiated pulse DP, the content of the read-write memory device 4 is changed to the key data KD' produced by the priority circuit 2 and the key data KD' is held and continuously produced until the next differentiated pulse DP is received, and the address of the note-octave memory device 23 is changed corresponding to the key data KD' produced by the read-write memory device 4 to read out a note signal NS and an octace signal OS stored in the address and corresponding to the tone pitch of the depressed key.

Since the all bits of the count of the counter 26 shown in FIG. 10 are zero, the output of inverter 28 supplied with the most significant bit signal of its count signal CP is "1". When key-on signal KON is generated under these conditions, AND gate circuit 29 is enabled to apply the attack clock pulse AC produced by the attack clock pulse generator 24 to the counter 26 via OR gate circuit 31. As a consequence, the count of the counter 26 increases gradually by sequentially counting the number of the attack pulses AC. When count signal CP of the counter 26 reaches [512] and when its most significant bit signal becomes "1" the output of inverter 28 becomes "0" whereby the AND gate circuit 29 is disenabled to stop the counting operation of the counter 26. Thereafter when the key-on signal decreases to "0" due to key release the output of inverter 27 becomes "1" whereby the AND gate circuit 30 is enabled to apply the decay clock pulse DC generated by the decay clock pulse generator 25 to counter 26 through OR gate circuit 31 to be counted by the counter. Consequently, the count of the counter 26 increases gradually from [513] by counting the number of the decay clock pulses DC. When the counter 26 counts one after its count has reached [1023], it overflows so that all bits of its count becomes zero. Accordingly both AND gate circuits 29 and 30 are disenabled to terminate the counting operation. As above described, between an instant of generating the key-on signal KON and an instant at which the count reaches [512], the counter 26 counts the number of the attack clock pulse AC having a relatively short period and generated by the attack clock pulse generator 24 whereas it interrupts its counting operation after its count has exceeded [512] and until the key-on signal KON is decreased by the release of the key thus maintaining this condition. When the key-on signal decreases, the counter 26 now counts the number of the decay clock pulses DC produced by the decay clock pulse oscillator 25 to increase its count. When the count exceeds [1023], the counter 26 overflows and all bits of its count become zero thus stopping the counting operation. The count signal CP of the counter 26 which operates in a manner just described applied to the address decoder 32 and the envelope waveform generator 38. The address decoder 32 converts the count signal CP into 6 bit address signals AS shown in Table 3 to address the constant memory device 33a and the change address memory device 33b. Accordingly, 6 types of the constants $K_A$ and $K_B$ and a change address point signal CA are successively read out from these memory devices in accordance with the contents I through IV of the address signal AS from the address decoder. The constants $K_A$ and $K_B$ thus read out are respectively multiplied by the multipliers 34 and 35 with the note signal NS supplied by the note-octave memory device 23 and corresponding to the note of the depressed key, and the outputs of the multipliers are shifted by an octave signal OS supplied by the note-octace memory device 23 and corresponding to the octave of the depressed key to form frequency informations $F_A$ and $F_B$ corresponding to the tone pitch of the depressed key. These frequency informations $F_A$ and $F_B$ are applied to the inputs A and B respectively of the selector 13.

Where the constants $K_A$ and $K_B$ stored in the constant memory device 33a correspond to the highest note B of 12 notes C through B, for example, the contents of the note signal NS produced by the note-octave memory device 23 are as shown in Table 4.

TABLE 4

| note of depressed key | content of note signal NS (decimal notation) |
|---|---|
| B | 2 |
| A# | $2^{11/12}$ |
| A | $2^{10/12}$ |
| G# | $2^{9/12}$ |
| G | $2^{8/12}$ |
| F# | $2^{7/12}$ |
| F | $2^{6/12}$ |
| E | $2^{5/12}$ |
| D# | $2^{4/12}$ |
| D | $2^{3/12}$ |
| C# | $2^{2/12}$ |
| C | $2^{1/12}$ |

Where the constants $K_A$ and $K_B$ correspond to the highest octave (for example, the 6th octave) the contents of the octave signal OS are as shown in Table 5.

TABLE 5

| octave of depressed key | content of the octave signal OS |
|---|---|
| sixth octave | not shift |
| fifth octave | shift by one bit toward the least significant bit |
| fourth octave | shift by two bits toward the least significant bit |
| third octave | shift by three bits toward the least significant bit |
| second octave | shift by four bits toward the least significant bit |
| first octave | shift by five bits toward the least significant bit |

Thus the note signal NS and the octave signal having the contents as shown in Table 4 and 5 are read out from the note-octave memory device 23 so that the signals produced by the shift circuits 36 and 37 are the frequency informations $F_A$ and $F_B$ corresponding to the tone pitch of the depressed key.

As above described since the constants $K_A$ and $K_B$ and the change address point signal CA vary five times between the instant of generating the key-on signal KON and the terminations of the decay signal, the frequency informations $F_A$ and $F_B$ also vary correspondingly. Considering the frequency informations and the change address point signal CA, in the embodiment shown in FIG. 2, they are constant (not vary with time) between the generation of the key-on signal KON and the termination of the decay which are caused by a key operation, but in the embodiment shown in FIG. 10, these signals are caused to vary by the value of the count signal CP of the counter 26 starting from the generation of the key-on signal KON. In the same manner as in FIG. 2, the comparator 12 compares the accumulated value of qF' of the accumulator 6 with the change address point signal CA to apply its difference signal CS to selector 13 for selecting one of the frequency informations $F_A$ and $F_B$. As a consequence the accumulated value qF' acting as the address signal of the waveform memory device 7 changes its rate of increase at an intermediate point (corresponding to the change address point CA) of one period in the same manner as in the embodiment shown in FIG. 2. In this manner, by reading the waveform memory device 7 by using the accumulated value qF' as the address signal it is possible to deform the waveform, for example a sine wave, stored in the waveform memory device 7 and then read out the deformed wave as a musical tone wave. The shape of the waveform of the musical tone read out from the waveform memory device 7 varies sequentially with time starting from the time of generating the key-on signal as the frequency informations $F_A$ and $F_B$ and the change address point signal CA vary.

The count signal CP of the counter 26 is also applied to the envelope waveform generator 38, which in response to the variation of the address signal AS produced by the envelope waveform generator 38, generates an envelope waveform signal EC comprising first and second attack portions $A_1$ and $A_2$, first and second decay portions $D_1$ and $D_2$, a sustain portion S and third decay portion $D_3$ as shown in FIG. 11A. The envelope waveform signal EC thus generated is multiplied by the multiplier 9 with the musical waveform read out from the waveform memory device to impart thereto a volume envelope. The musical tone signal imparted with the volume envelope in this manner is produced by the sound system as a performance tone. Since the point at which the address signal AS produced by the address decoder 32 varies is made to coincide with the point at which the envelope waveform varies as above described, the constants $K_A$ and $K_B$ (frequency informations $F_A$, $F_B$) and the change address point signal CA vary respectively corresponding to first and second attack portions $A_1$ and $A_2$, first and second decay portions $D_1$ and $D_2$, the sustain portions S and third decay portion $D_3$ of the volume envelope whereby the color of the musical tone generated varies in accordance with the volume envelope thus enriching the content of the music.

Thus, in the electronic musical instrument of this invention it is possible not only to control the musical tone wave produced by the waveform memory device to have any desired shape but also to vary the waveform with time thus selecting any desired tone color and vary it with time.

Figure 13:
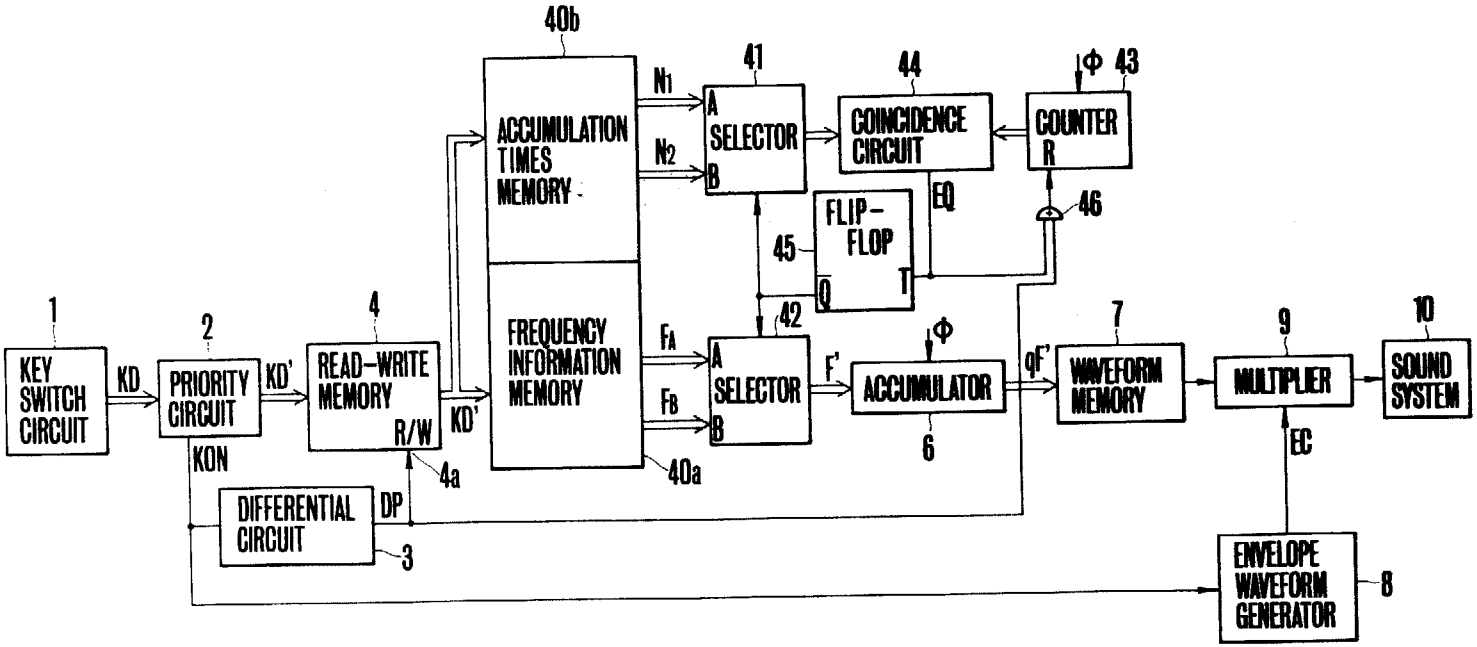
FIG. 13 is a block diagram showing another embodiment of the electronic musical instrument of this invention.

FIG. 13 shows still further embodiment of this invention in which circuit elements corresponding to those shown in FIG. 2 are designated by the same reference charactors. In FIG. 13, 40a and 40b represent a frequency information memory device and an accumulation number information memory device respectively which are addressed to read out their contents by a key data KD' produced by the read-write memory device 5, and the frequency informations $F_A$ and $F_B$ selected to the tone pitches of respective keys, and the accumulation number informations $N_1$ and $N_2$ (the instants at which frequency informations are switched) are stored in these memory devices respectively. A selector 41 is provided for selecting one of the accumulation number informations $N_1$ and $N_2$ supplied to its inputs A and B respectively and a selector 42 is provided for selecting one of the frequency informations $F_A$ and $F_B$ supplied to its inputs A and B respectively. There are also provided a counter 43 for counting the number of clock pulses $\phi$, a coincidence circuit 44 for comparing the accumulation number information $N_1$ or $N_2$ produced by the selector 41 with the count of the counter 43 to produce a coincidence signal EQ when a coincidence is obtained, a T type flip-flop circuit 45 triggered by the coincidence circuit EQ for selectively controlling the operation of selectors 41 and 42 by its Q output, and an OR gate circuit 46 for supplying the coincidence signal EQ from the coincidence circuit 44 or a differentiated signal DP from the differential circuit 3 to the reset terminal R of counter 43.

The embodiment shown in FIG. 13 operates as follows. When a key of the keyboard is depressed, the key switch circuit 1 produces a key data KD corresponding to the depressed key. A key data KD having a highest order of priority is selected by the priority circuit 2 and a key data KD' is produced thereby. The priority circuit 2 also produces a key-on signal KON showing that one of the keys is now being depressed. The key-on signal KON is differentiated by the differential circuit 3 to apply a differentiated pulse DP synchronous with building-up of the key-on signal KON to the read-write control terminal 4a of the read-write memory device 4. Consequently, the content of the read-write memory device 4 is changed to the key data KD' produced by the priority circuit 2 when the differentiated pulse DP is applied to the read-write memory device 4, and the key data KD' is held and continuously produced thereby until the next differentiated pulse DP is received.

The frequency memory device 40a and the accumulation number memory device 40b are addressed by the key data KD' supplied from the read-write memory device 4 to read out frequency informations $F_A$ and $F_B$ related to the tone pitch of the depressed key and the accumulation number informations $N_1$ and $N_2$ respectively. The counter 43 is reset since the differentiated pulse DP generated when the key is depressed is supplied to its reset terminal R through OR gate circuit 46 and thereafter the counter 43 successively counts the number of the clock pulses $\phi$ to increase its count. For this reason, at the commencement of key depression the coincidence circuit 44 would not produce any coincidence signal EQ (EQ="0") so that the flip-flop circuit 45 applies its Q output to selectors 41 and 42 to cause them to select and produce the accumulated number information $N_1$ and frequency information $F_A$ respectively applied to their input terminals A. Consequently, at the timing of the clock pulse $\phi$ accumulator 6 sequentially accumulates the frequency information $F_A$ which is generated by selector 42 in synchronism with the counting timing of counter 43 for applying its accumulated value qF' (or $qF_A$, where q=0, 1, 2 . . . ) to the waveform memory device 9 to act as the address signal. Consequently, the count of the counter 43 and the accumulation number of the accumulator 6 coincide with each other. As the count of the counter 43 increases gradually to become coincidenct with the accumulated number information $N_1$ produced by the selector 41, a coincidence signal EQ would be produced from coincidence circuit 44 (EQ="1"). The state of the flip-flop circuit 45 is reversed by the coincidence signal EQ to turn its reset output Q to "0" whereby the selectors 41 and 42 select and produce the accumulation number information $N_2$ and the frequency information $F_B$ respectively supplied to their inputs B. Consequently, the accumulator 6 successively accumulates the frequency information $F_B$ having a value different from that of the frequency information $F_A$ at the timing of the clock pulse $\phi$ for applying the accumulated value qF' ($qF_B$) to the waveform memory device 7 as an address signal. Further, the counter 43 in reset by the coincidence signal EQ produced by the coincidence circuit 44 thus counting the number of the clock pulses $\phi$. When the count of the counter 43 coincides with the accumulated number information $N_2$ produced by the selector 41 the coincidence circuit 44 would produce a coincidence signal EQ thus resetting the counter 43. Concurrently therewith, the state of the flip-flop circuit 45 is reversed again whereby the selectors 41 and 42 select and produce the accumulated number information $N_1$ and the frequency information $F_A$ respectively applied to their inputs A.

After repeating the operations described above the accumulator 6 generates an accumulated value qF' which is obtained by successively accumulating the frequency information $F_A$ or $F_B$ which is switched at each predetermined time (corresponding to the accumulation number informations $N_1$ and $N_2$). The accumulated value qF' thus produced by the accumulator 6 is used to address the waveform memory device 7 to successively read out the amplitude values of a desired musical tone waveform at successive sampling points and stored in respective addresses of the memory device 7 thus generating a musical tone waveform. The musical tone waveform read out from the waveform memory device 7 is multiplied with the envelope waveform signal generated by the envelope control waveform generator 8 by the multiplier 9 to be imparted with a volume envelope and the musical tone signal imparted with the volume envelope is converted into a performance tone by the sound system 10.

Consider new the relationship between the accumulated value qF' produced by the accumulator 6 and the musical tone waveform read out from the waveform memory device 7.

Assume now that the frequency informations $F_A$ and $F_B$ are accumulated $N_1$ and $N_2$ times respectively in accordance with the accumulated number informations $N_1$ and $N_2$ the resulting accumulated value would be: $qF'=N_1.F_A+N_2.F_B$ and the required number to obtain this value would be $(N_1+N_2)(1/f_\phi)$, where $f_\phi$ represents the frequency of the clock pulse. When the values of the frequency informations $F_A$ and $F_B$ and the values of the accumulation number informations $N_1$ and $N_2$ are selected such that the number of $(N_1 \cdot F_A+N_2 \cdot F_B)$ would be equal to the address number M (most significant address M=1024 for example) of the waveform memory device 7, one of the musical tone waveforms stored in the waveform memory device 7 would be read out when the accumulator 6 accumulates $(N_1+N_2)$ times. Since the frequency information applied to the accumulator 6 is switched from the frequency information $F_A$ to the frequency information $F_B$ after the accumulating operations of $N_1$ times the rate of change (rate of rise of the accumulated value qF') of the accumulator 6 varies at an intermediate point of one period of the waveform memory address. Where the frequency informations $F_A$ and $F_B$ have a relationship $F_A<F_B$, the rate of change of the accumulated value qF' in small in the fore half, but large in the later half. The reverse is true where $F_A>F_B$.

This means that the speed of shifting the address of the waveform memory device caused by the accumulated value of the accumulator 6 varies at an intermediate point in one period of addressing with the result that the shape of the musical tone waveform read out from the waveform memory device 7 varies in the same manner as in the embodiment shown in FIG. 2.

When the value of $(N_1 \cdot F_A+N_2.F_B)$ is selected to the larger than the number of addresses M of the waveform memory device 7, after the accumulator 6 has made $(N_1+N_2)$ times of the accumulation, the addressing operation of the waveform memory device 7 would exceed one period by $(N_1 \cdot F_A+N_2 \cdot F_B-M)$ [the accumulated value qF' of the accumulator 6 would be $(N_1.F_A+N_2 \cdot F_B-M)$]. In other words, (one period $+\alpha$) of the stored waveform would be read out from the waveform memory device 7 ($\alpha$ corresponds to the surplus address) under these conditions, the accumulated value qF' at the switching point between the frequency informations applied to the accumulator 6 is caused to vary at each accumulation period $(N_1 \cdot F_A+N_2 \cdot F_B)$ due to the presence of $\alpha$ whereby the position of the waveform memory device 7 at the switching point between the frequency informations $F_A$ and $F_B$ varies at each accumulation period thus changing the shape of the waveform read out from the waveform memory device 7 during each period of addressing.

In this manner, as the shape of the waveform stored in and read out from the waveform memory device 7 varies in each address period and the periodicity of the waveform variation will be considered hereunder.

Denoting $(N_1 \cdot F_A+N_2 \cdot F_B)$ as one frame and suppose now that the accumulator 6 repeats frames (x means an interger), the accumulated value would be expressed by $x(N_1 \cdot F_A+N_2 \cdot F_B)$. However, the actual accumulated value qF' of the accumulator 6 (the present address of the waveform memory device 7, is expressed by $x(N_1 \cdot F_A + N_2 \cdot F_B - M)$. The value of x (that is $x_o$) when the value $x(N_1 \cdot F_A + N_2 \cdot F_B - M)$ becomes equal to the number of the most significant address of the waveform memory device 7 can be obtained by the following equation since $x_0(N_1 \cdot F_A + N_2 \cdot F_B - M) = M$, $$x_0 = (M / N_1 \cdot F_A + N_2 \cdot F_B - M)$$

In other words, the accumulator 6 has repeated $x_0$ times the accumulation operation of $(N_1 \cdot F_A + N_2 \cdot F_A)$ (the accumulates value qF' becomes equal to M), the waveform stored in the waveform memory device 7 would be read out $(x_0 + 1)$ times.

The waveform memory device 7 produces an output having the same waveform pattern each time the accumulating operation of $(N_1 \cdot F_A + N_2 \cdot F_B)$ is repeated $x_0$ times. Accordingly, in this case a musical tone waveform having period of "stored waveform plus one" can be produced by the waveform memory device 7. There are the following relationship:

$$\frac{1}{f_c} = \frac{1}{f_\phi} \cdot (N_1 + N_2) \cdot x_0$$

$$f_c = \frac{N_1 \cdot F_A + N_2 \cdot F_B - M}{M} \cdot \frac{1}{N_1 + N_2} \cdot f_\phi$$

where $f_c$ represents the frequency of the musical waveform and $f_\phi$ that of the clock pulse $\phi$.

Figure 14:
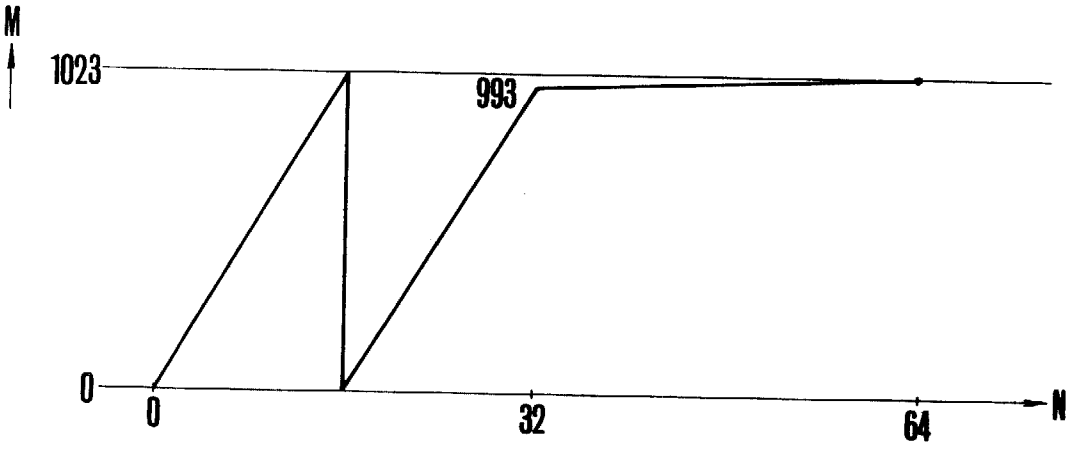
FIGS. 14 and 15 are graphs showing the variation in the accumulated value of the accumulator shown in FIG. 13 and FIGS. 16 and 17 show one example of the output wave form of the waveform memory device shown in FIG. 13.
Figure 15:
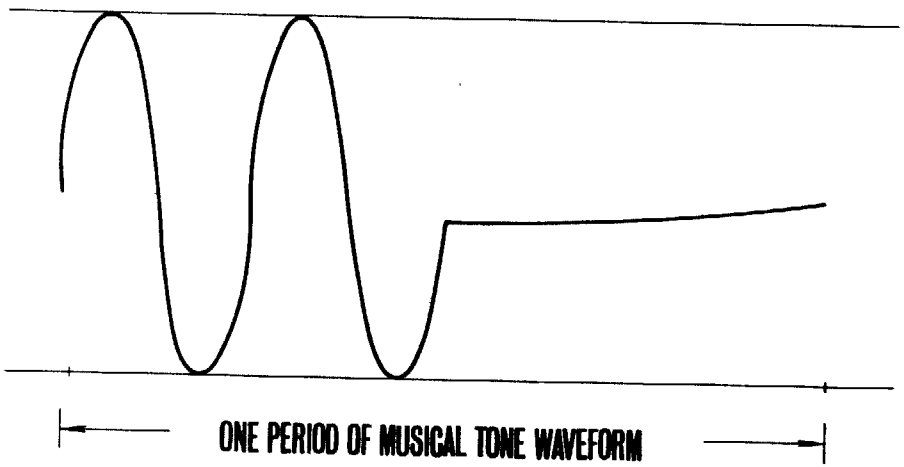

On the other hand, since the accumulating period of the accumulator 6 caused by clock pulse $\phi$ is $1/f_\phi$ the switching period between frequency informations $F_A$ and $F_B$ performed at each interval $(N_1 + N_2)$ is $1/f_m = 1/f_\phi \cdot (N_1 + N_2)$. Consequently, the waveform of the musical tone read out from the waveform memory device 7 varies $f_m$ times (where $f_m = f_o / N_1 + N_2$) during one period. In other words, the musical tone wave is subjected to a frequency modulation with a frequency of fm. For this reason, the musical tone waveform read out from the waveform memory device 7 contains a frequency components consisting of $f_c \pm n f_m$ where $n = 1, 2, 3 \ldots$ Describing more concretely, it is assumed now that the amplitude values at successive sampling points in one period of a sine wave are stored in respective addresses of the waveform memory device and that the number of addresses of the waveform memory device 7 $M = 1024$, the frequency of the clock pulse $f_\phi = 28.16$ $kH_Z$, frequency informations $F_A = 63.0$, $F_B = 1.0$, and that the accumulation number informations $N_1 = N_2 = 32$. Thus, when the frequency information $F_A = 63.0$ is accumulated $N_1 = 32$ times, the accumulated value becomes [2016]. However, as shown in FIG. 14 accumulator 6 having a modulo of [1023] reaches a state wherein [993] (=2016—1023) has been accumulated in the second period. Under this state, since the selectors 41 and 42 select and produce the frequency information $F_A = 1.0$, after the count [993] the accumulator 6 would accumulate [10] for 32 times with the timing of the clock pulse. The accumulated value qF' of the accumulator 6 after N times $(N = N_1 + N_2 = = 32 + 32 = 64)$ becomes [1023] thus completing one cycle of operation. When the waveform memory device 7 storing one period of a sine wave is addressed with the accumulated value qF' (FIG. 14) which varies in this manner a musical tone waveform having one unit wave (period) and consisting of two waveforms wherein the sine waveform has been deformed in a complex manner as shown FIG. 15. In this case the frequency $f_c$ of the read out musical tone waveform becomes $$f_c = (28.16\ kH_Z / 64) = 440\ H_Z$$

Figure 16:
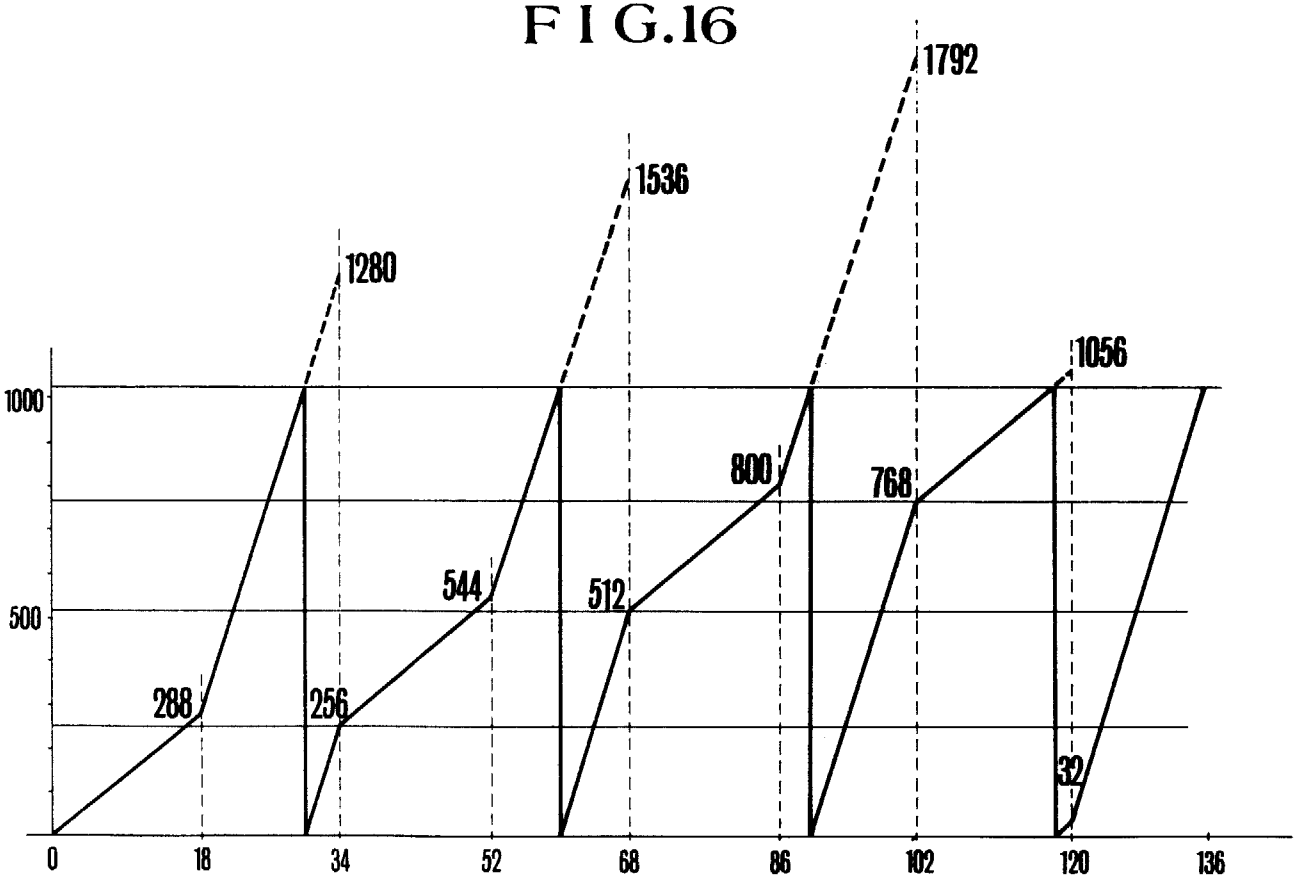
Figure 17:
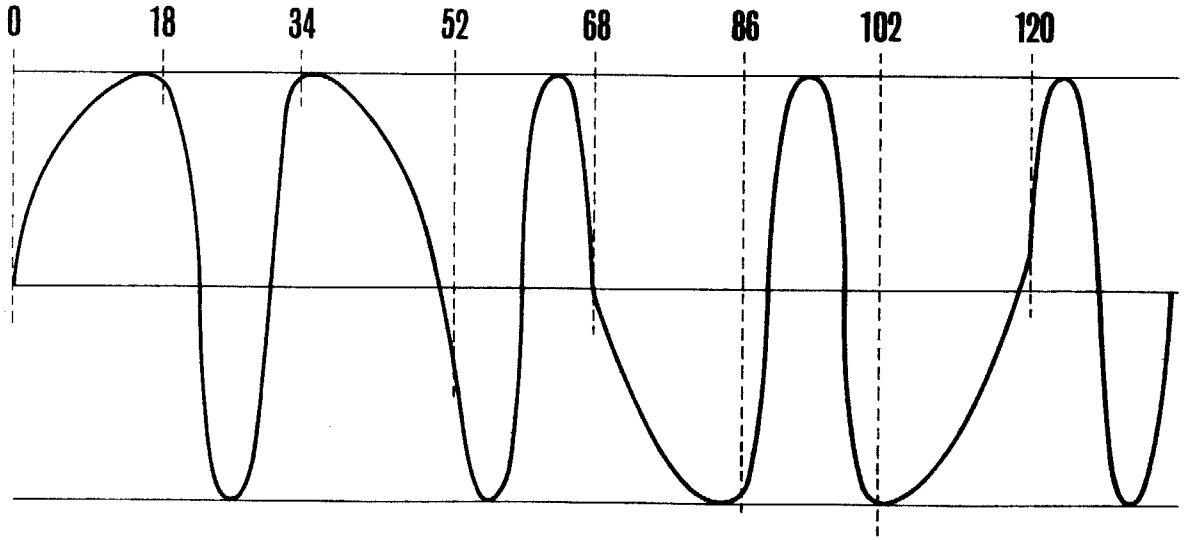

On the other hand, where $M = 1024$, $f_\phi = 28.16$ $kH_Z$, $N_1 = 18$, $N_2 = 16$, $F_A = 16$, $F_B = 62$, the variation in the accumulated value qF' of the accumulator 6 is shown by FIG. 16. Thus, the accumulated value qF' of the accumulator 6 coincides with $M = 1024$ only after completing five cycles. By this time the accumulator 6 has repeated 4 times the accumulation of $(N_1 \cdot F_A + N_2 \cdot F_B)$. Thus, one cycle of the operation for obtaining the accumulated value qF' completes each time when 136 $[(N_1 + N_2).4 = 34 \times 4 = 136]$ times of accumulation is made. Thus, when the waveform memory device 7 storing one period of a sine wave is addressed by using the accumulated value which varies in a complicated manner as above described as the address signal, the output read out from the waveform memory device constitutes a musical tone wave including one unit (period) consisting of 5 waveforms which have been deformed in a complicated manner as shown in FIG. 17.

The modulation frequency $f_m$ can be determined as follows.

$$f_m = 828.28529 = 4 f_c$$

$$f_c = 208.05882 = \tfrac{1}{4} f_m$$

Since the frequency components of the resulting musical tone signal are $f_c \pm n f_m$, it will be noted that the musical tone waveform shown in FIG. 17 contains only odd higher harmonic components. Since the tone color is determined by the distribution characteristics of the higher harmonic components it is possible to control the color of the generated musical tone by the suitable selection of various parameters $N_1$, $N_2$, $F_4$ and $F_5$.

While in the foregoing description, $(N_1 \cdot F_A + N_2 \cdot F_B)$ was selected to be larger than the number of addresses M of the accumulator 6 it will be noted that $(N_1 \cdot F_A + N_2 \cdot F_A)$ can be selected to be less than the number of addresses.

In the embodiment of the electronic musical instrument shown in FIG. 13, the switching between the frequency informations supplied to the accumulator 6 is effected by the accumulation number of the accumulator 6 so that such switching can be made either during one or plurality of cycles (or periods) of the continuous accumulating operations which characterizes this embodiment. In the latter case, the shape of the waveform read out from the waveform memory device 7 varies periodically during one period of addressing the waveform memory devices whereby it is possible to obtain a musical tone wave which varies in a more complicated manner.

Although in the foregoing embodiments a plurality of frequency informations ($F_A$, $F_B$ and $F_C$) were read out from a frequency information memory device it should be understood that it is possible to read out either one of a set of frequency informations ($F_A$, $F_B$ and $F_C$) and then produce a plurality of sets of frequency informations by logically processing the read out frequency information.

As above described, in the electronic musical instrument of this invention, the speed of addressing the waveform memory device is varied as an intermediate point of the addressing operation so as to read out a deformed waveform from the memory device. Consequently it is possible to readily produce musical tone waves having various shapes from a single waveform memory device storing a simple waveform.

What is claimed is:

1. An electronic musical instrument comprising a keyboard provided with a plurality of keys for respective tone pitches, means for generating a plurality of frequency informations corresponding to the tone pitch of depressed one of said keys, selecting means for selecting one at a time of said plurality of frequency informations produced by said frequency information generating means, accumulating means for repeatedly accumulating the frequency information selected by said selecting means to produce a progressing accumulated value, a waveform memory device which is adapted to store amplitude values at successive sampling points in one period of a waveform utilized to form a desired musical waveform and which is addressed with said progressing accumulated value from the accumulating means, control means for switching the selecting operation of said selecting means during the accumulating operation of said accumulating means to select different ones time wisely from among said plurality of frequency informations, and means for converting said musical tone waveform read out from said waveform memory device into a musical tone.

2. An electronic musical instrument according to claim 1 wherein said control means comprises a detector which detects the fact that said accumulated value has reached a predetermined value for controlling the switching of said selecting means.

3. An electronic musical instrument according to claim 1 wherein said control means comprises means responsive to a predetermined number of accumulations for controlling the switching of said selecting means.

*4. An electronic musical instrument comprising:*

*a keyboard provided with a plurality of keys for respective tone pitches,*

*means for providing a plurality of frequency informations in accordance with the tone pitch of a depressed one of said keys,*

*selecting means for selecting one at a time which of said plurality of frequency informations is provided by said frequency information generating means,*

*arithmetic operation means responsive to the frequency information selected by said selecting means for producing an address signal by carrying out repetitive arithmetic operations utilizing said selected frequency information, said produced address signal varying at a rate corresponding to the selected frequency information,*

*a waveform memory device which is adapted to store amplitude values at successive sampling points in one portion of a waveform utilized to form a desired musical waveform and which is addressed with said address signal from the arithmetic operation means,*

*control means for switching the selecting operation of said selecting means during the operation of said arithmetic operation means to select different ones time wisely from among said plurality of frequency informations, and*

*means for converting said musical tone waveform read out from said waveform memory device into a musical tone.*

*5. An electronic musical instrument according to claim 4 in which said control means responds to said address signal to detect when the address signal is in a predetermined state thereby switching the selecting operation of said selecting means in accordance with the address signal.*

*6. In an electronic musical instrument having a keyboard provided with a plurality of keys for respective tone pitches, each key being represented by a key code, the improvement comprising:*

*means for providing a plurality of frequency informations in accordance with the key code of a depressed one of said keys,*

*selecting means for selecting one at a time which of said plurality of frequency informations is provided by said frequency information generating means,*

*accumulated value means for repeatedly utilizing the frequency information selected by said selecting means to produce progressively changing accumulated values,*

*a waveform memory device which is adapted to store amplitude values at successive sampling points in one portion of a waveform utilized to form a desired musical waveform and which is addressed with said progressing accumulated values from the accumulated value means,*

*control means for switching the selecting operation of said selecting means during the operation of said accumulated value means to select different ones time wisely from among said plurality of frequency informations, and*

*means for converting said musical tone waveform read out from said waveform memory device into a musical tone.*

*7. In an electronic musical instrument of the type in which a waveform memory device stores values indicative of musical waveform amplitudes at successive sample points, and in which said values are repetitively read out from the memory device and converted to a musical tone, the improvement comprising:*

*means for providing first and second tone frequency related constants,*

*a counter having a modulo corresponding to the number of sample point values stored in said waveform memory device, the contents of said counter being used as an address signal to read out said waveform memory device,*

*means for repetitively utilizing a supplied one of said first or second frequency related constants to cause incrementing of said counter at a rate established by the value of the utilized frequency constant, so that the accumulated contents of said counter constitutes an address signal that changes progressively at a rate established by the utilized frequency constant,*

*selector means, connected to said counter and responsive to the accumulated contents thereof, for causing one or the other of said first and second provided frequency related constants to be supplied to said means for utilizing in accordance with a comparison between the accumulated contents of said counter and a certain change point value.*

*8. An electronic musical instrument according to claim 7 wherein said frequency related constants are in binary format, and further having:*

*a shift circuit, cooperating with said selector means, for shifting said provided frequency related constants by a degree in accordance with the octave of a selected note.*

* * * * *